(12) United States Patent
Boesel

(10) Patent No.: US 10,174,644 B2
(45) Date of Patent: Jan. 8, 2019

(54) MULTIPART ROTOR FOR A HYDRAULIC CAMSHAFT ADJUSTER WITH A SUPPLY OF OIL TO THE PRESSURE CHAMBERS THROUGH THE VANES

(71) Applicant: Schaeffler Technologies AG & Co. KG, Herzogenaurach (DE)

(72) Inventor: Christian Boesel, Rednitzhembach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/914,977

(22) PCT Filed: Jul. 7, 2014

(86) PCT No.: PCT/DE2014/200308
§ 371 (c)(1),
(2) Date: Feb. 26, 2016

(87) PCT Pub. No.: WO2015/028004
PCT Pub. Date: Mar. 5, 2015

(65) Prior Publication Data
US 2016/0215659 A1  Jul. 28, 2016

(30) Foreign Application Priority Data
Aug. 27, 2013 (DE) .................. 10 2013 217 017

(51) Int. Cl.
*F01L 1/34* (2006.01)
*F01L 1/344* (2006.01)
*F16H 53/04* (2006.01)

(52) U.S. Cl.
CPC ............ *F01L 1/3442* (2013.01); *F16H 53/04* (2013.01)

(58) Field of Classification Search
CPC ............ F01L 1/34; F01L 1/3442; F16H 53/04
USPC .......................................... 123/90.15, 90.17
See application file for complete search history.

(56) References Cited

U.S. PATENT DOCUMENTS

| | | |
|---|---|---|
| 2,861,557 A | 11/1958 | Stolte et al. |
| 7,640,902 B2 | 1/2010 | Knecht |
| 8,307,796 B2 | 11/2012 | Bayrakdar |
| 8,490,589 B2 | 7/2013 | Arnold |
| 8,550,046 B2 | 10/2013 | Terfloth et al. |
| 8,578,899 B2 | 11/2013 | Ottersbach et al. |
| 8,752,517 B2 | 6/2014 | Boese et al. |
| 8,925,506 B2 | 1/2015 | Watanabe |

(Continued)

FOREIGN PATENT DOCUMENTS

| | | |
|---|---|---|
| CN | 103075220 | 5/2013 |
| DE | 39 37 644 A1 | 5/1991 |

(Continued)

*Primary Examiner* — Ching Chang
(74) *Attorney, Agent, or Firm* — Davidson, Davidson & Kappel, LLC

(57) ABSTRACT

A hydraulic camshaft adjuster (1) with a stator (2) in which a rotor (3) is rotatably arranged. A vane (4) which protrudes radially outwards is provided on the rotor (3), the vane being provided with a pressure chamber delimiting side (7). A pressure chamber supply groove (10) is arranged so as to extend on a separation plane which separates the rotor (3) into two halves in order to supply a hydraulic medium to a pressure chamber formed by the rotor (3) and the stator (2), the pressure chamber supply groove (10) having an outlet (11) in the pressure chamber delimiting side (7) of the vane (4).

12 Claims, 2 Drawing Sheets

(56) References Cited

U.S. PATENT DOCUMENTS

2013/0199479 A1  8/2013  Ottersbach et al.
2014/0238325 A1  8/2014  Frey

FOREIGN PATENT DOCUMENTS

| DE | 10 2007 020 526 A1 | 11/2008 |
| DE | 10 2009 031 934 A1 | 1/2011 |
| DE | 102009053600 | 5/2011 |
| DE | 10 2010 050 814 A1 | 5/2012 |
| DE | 102010050606 | 5/2012 |
| DE | 102011117856 | 5/2013 |
| EP | 1 731 722 B1 | 12/2006 |
| JP | H08121124 A | 5/1996 |
| JP | H10339114 | 12/1998 |
| WO | WO2009152987 | 12/2009 |
| WO | WO 2010 128976 A1 | 11/2010 |
| WO | WO2011/098331 | 8/2011 |

MULTIPART ROTOR FOR A HYDRAULIC CAMSHAFT ADJUSTER WITH A SUPPLY OF OIL TO THE PRESSURE CHAMBERS THROUGH THE VANES

The present invention relates to a hydraulic camshaft adjuster, including a stator in which a rotor is rotatably situated, a radially outwardly projecting vane being present on the rotor, which is provided with a pressure chamber delimiting side, a pressure chamber supply groove being situated in such a way that it runs on a separating plane, which divides the rotor into two halves for the purpose of supplying hydraulic medium to a pressure chamber formed by the rotor and the stator.

BACKGROUND

A pressure chamber delimiting side is the side of the vane which usually defines a plane, the plane running in the direction of the rotation axis of the rotor in one dimension and running approximately in the radial direction in another dimension. The pressure chamber delimiting side delimits the pressure chamber in which the hydraulic medium, such as oil, in particular pressure oil, is introduced for the purpose of achieving an adjustment of the rotor relative to the stator. The pressure chamber delimiting side usually projects orthogonally away from an outer lateral surface of the rotor in the direction of the stator.

Camshaft adjusters are already known from the prior art, for example from WO 2010 128976 A1. Camshaft adjusters which include oscillating motor rotors are also known from EP 1 731 722 B1.

A hydraulic camshaft adjuster is also known from DE 10 2008 028 640 A1. A hydraulic camshaft adjuster is disclosed therein, which includes a drivable outer body and has at least one hydraulic chamber as well as an inner body, which is situated internally with respect to the outer body, is fixedly connectable to a camshaft and has at least one variable vane, which extends into the hydraulic chamber in the radial direction and divides the hydraulic chamber into a first working chamber and a second working chamber. Working chambers of this type are also referred to as pressure chambers. The inner body furthermore includes at least one oil supply and oil discharge line, which extends from a jacket interior to a jacket exterior of the inner body up to one of the two working chambers. The inner body is assembled at least from a first element and a second element, the two elements having at least one geometry on front sides facing each other, which, together with the particular other element, form the oil supply and oil discharge line of the inner part. An oil supply and oil discharge line of this type may be configured as a pressure chamber supply groove.

A similar hydraulic camshaft adjuster is also known from DE 10 2009 031 934 A1. A camshaft adjuster is disclosed therein, which includes a stator and a rotor situated in the stator, which has vanes which are each situated in a chamber formed between the stator and the rotor, the vanes dividing their particular chambers into two partial chambers (in the sense of pressure chambers), and it being possible to supply each chamber with pressure oil via oil channels and discharge pressure oil from each chamber, so that the pressure oil is able to apply a torque to the rotor, the rotor being rotatably adjustable and thereby induce a camshaft adjustment, the rotor being constructed from a metallic base framework, which axially adjacently has a casing made of plastic in which at least one of the oil channels is formed.

Camshaft adjusters of this type may be used in interaction with chain or belt drives. Rotors which include fixed vanes may be used. Previously, however, oil bores have been used as pressure chamber supply grooves, which essentially extend through the rotor in the radial direction.

They are usually introduced with the aid of a mechanical remachining process. Metal-cutting methods such as drilling methods are often used.

The principle of dividing a rotor in a radial plane, in particular dividing it in two, are also known from the known publications. The radial plane is situated perpendicularly to a rotation axis of the rotor and extends in the radial direction.

SUMMARY OF THE INVENTION

In divided rotors of this type, however, which include two individual components, the oil distribution is usually implemented through radial bores which run outside rotor vanes. In this system, the bearing point in the stator must be made smaller to supply the working chambers with oil, since the bearing point would otherwise cover the oil bore. However, reducing the width of the bearing may unfortunately result in higher leaks, increased wear and a reduction in the size of the adjustment angle.

It is an object of the present invention to provide a design, in which no reduction of the radial bearing point is necessary to implement the oil supply from the rotor into the pressure chambers/working chambers. A design of this type should simultaneously facilitate a cost-effective manufacture.

The present invention provides a hydraulic camshaft adjuster wherein the pressure chamber supply groove has an outlet in/on the pressure chamber delimiting side of the vane.

On the upper side of the rotor, a stamped oil guide/pressure chamber supply groove/oil supply bore may be impressed on a flat side for the purpose of unlocking a (locking) bolt, and radial bores, which lead out of the rotor vane "on the front side" (i.e., "in the circumferential direction" with regard to the overall rotor), may be present in the parting plane. The underside of the rotor may also be provided with stamped radial bores in the parting plane, which lead out of the rotor vane "on the front side." The radial bores do not have to be machined, i.e., not necessarily in the manner of bores, but may be introduced into a sintered component in stamping steps. The oil guide may be implemented in the striking vane as well as in any other vane which is used to separate the pressure chambers.

It is thus advantageous if the oil supply groove extends radially outwardly from a radially inner edge of the rotor into the vane, where it has a bend/deflection, from which the oil supply groove runs transversely, e.g., orthogonally with respect to the radial direction, preferably oriented in the circumferential direction. Oil delivered into the pressure chamber then exits orthogonally from the pressure chamber delimiting side of the vane and may hit the front side of a stator-integral movement limiting component designed as a projection. This surface is oriented in the direction of the rotation axis of the rotor and is not to be understood as an axial front surface but rather a front surface which is perpendicular to the circumferential direction.

It is also advantageous if the entire oil supply groove runs in the parting plane, one half of the oil supply groove being situated in a first half of the rotor, and the other half of the oil supply groove being situated in a second half of the rotor. The two halves of the oil supply groove complement each other in such a way that a line having a preferably circular cross section is formed, whose outer contour is sealed with respect to the fluid line.

One advantageous exemplary embodiment is also characterized in that a contact surface which is provided for coming into contact with a movement limiting component designed as an integral projection of the stator is formed on the stop side of the vane and into which the pressure chamber supply groove opens, i.e., has its outlet therein.

To also facilitate a locking of the rotor relative to the stator, it is advantageous if a direct fluid supply line, designed for example as a worm groove or a worm conduit, branches from the pressure chamber supply groove to a locking pin actuating pocket. A locking pin may movably abut the locking pin actuating pocket or be situated therein.

It is also advantageous if the fluid supply line has one or multiple bends, e.g., 90° diversions. Only a slight friction loss is then detected. If the angle of the bend is less than 90°, however, losses are higher, the losses being lower in the case of an angle greater than 90°. A slight yet continuous curvature in the pressure chamber supply groove would, however, be entirely desirable.

To be able to resort to sintering materials, it is advantageous if fluid supply lines usable for locking purposes are fully accommodated in the rotor, e.g., in the first half of the rotor or in the second half of the rotor, or if they are accommodated, partially in the rotor, e.g., in the first half of the rotor or the second half of the rotor, divided along their length, e.g., in half.

One advantageous exemplary embodiment is also characterized in that a sliding sealing insert is present in the vane, and the bend or deflection is positioned at a distance therefrom.

For the efficient functioning of the hydraulic camshaft adjuster, it is advantageous if the pressure chamber delimiting side is designed as a stop side, and the stop side may be brought into contact with a movement limiting component, which is rotatably fixedly mounted on the stator.

It is also advantageous if multiple pressure chambers are present and each pressure chamber may be or is fluidically connected to at least one dedicated pressure chamber supply groove which has a circular cross section.

The present invention also relates to a hydraulic camshaft adjuster, which includes a stator in which a rotor is rotatably situated, a locking pin, which is actuatable with the aid of a hydraulic medium, such as pressure oil, being extendably mounted on the rotor, and the pressure chambers formed between the rotor and the stator each being fillable with the hydraulic medium via at least one pressure chamber supply groove.

It is advantageous if a direct connection exists between the locking pin and the pressure chamber supply groove in the rotor.

It is desirable if the direct connection is a fluid supply line or a worm groove.

If the fluid supply line is present in a first and/or a second half of the rotor, sintering material, in turn, may be used.

It is advantageous if the fluid supply line ends in a locking bore.

The costs may be reduced due to the present invention. A high mechanical machining complexity is avoided. It is nevertheless possible to machine the rotor of a camshaft adjuster, to drill the radial oil supply channels, to lathe the inner contour or centering diameter and to grind flat sides for height and evenness. However, no major investment is now needed for mechanical machine tools, whereby the manufacturing costs are reduced. The rotor design without machining increases the competitive opportunities. The goal of achieving a design of a multipart, assembled rotor made of a sintering material, in which no mechanical machining is carried out, is achieved thereby.

BRIEF DESCRIPTION OF THE DRAWINGS

The present invention is explained in greater detail below with the aid of multiple exemplary embodiments.

DETAILED DESCRIPTION

Figure 1:
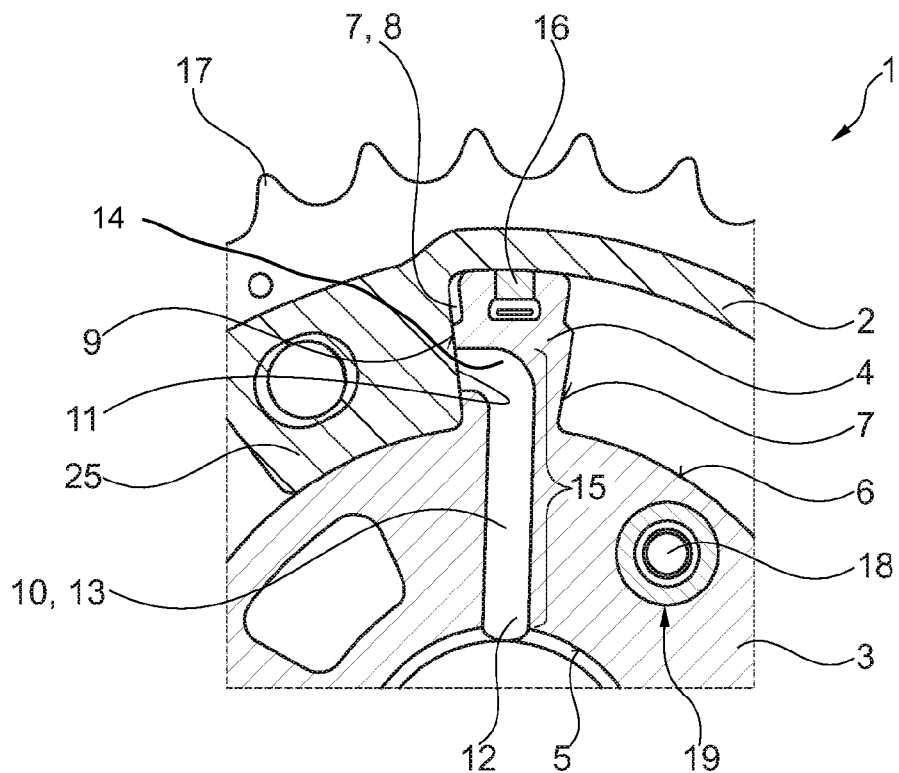
FIG. 1 shows a detail of a hydraulic camshaft adjuster in a first specific embodiment according to the present invention, in which a pressure chamber supply groove runs through a vane of the rotor and exits the rotor vane "on the front side," i.e., is oriented in the tangential direction and faces a movement limiting component.

The figures are only of a schematic nature and are used only for the sake of understanding the present invention. Identical elements are provided with identical reference numerals. Different features of the individual exemplary embodiments may also be used in the other exemplary embodiments. They are therefore interchangeable with each other.

FIG. 1 shows a first specific embodiment of a hydraulic camshaft adjuster 1 according to the present invention. Camshaft adjuster 1 includes a stator 2, in which a rotor 3 is rotatably supported. Rotor 3 includes vanes 4 which point radially outwardly.

Rotor 3 has a radial inside 5 and a radially outer lateral surface 6. Vane 4 projects radially from lateral surface 6 and has two pressure chamber delimiting sides 7, at least one of which is formed as a stop side 8. Stop side 8 has a contact surface 9, into which a pressure chamber supply groove 10 opens. An outlet 11 of pressure chamber supply groove 10 is then present in contact surface 9, whereas an inlet 12 is situated on radial inside 5 of rotor 3. Pressure chamber supply groove 10, which is designed as oil supply groove 13, extends therebetween. A bend/deflection 14 is also present in the interior of rotor 3. A sliding sealing insert 16 is present in the extension of a main section 15 of pressure chamber supply groove 10.

Stator 2 also includes a toothing 17 on its outside. Toothing 17 may also be provided by a component 2 which is separate from stator 2. This separate component is then rotatably fixedly connected to stator 2.

Figure 4:
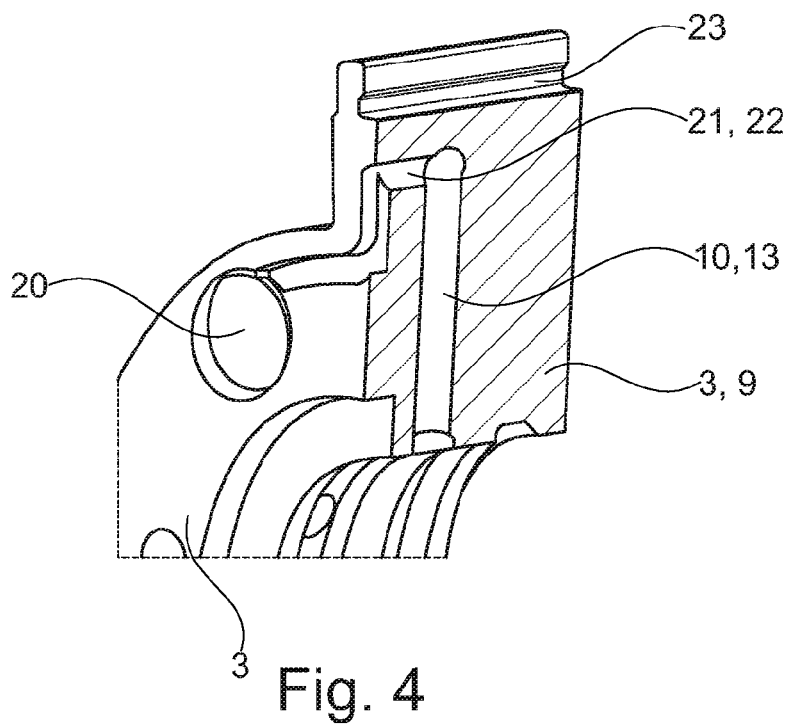
FIG. 4 shows another specific embodiment of a one-part rotor in a detail, which is shown perspectively and in a longitudinal section.

A locking pin 18 is longitudinally movably supported in a recess 19 such as a hole. Recess 19 opens into a locking pin actuating pocket 20. This locking pin actuating pocket 20 is directly fluidically connected to pressure chamber supply groove 10 via a fluid supply line 21, for example in the manner of a worm groove 22. Pressure oil may thus be guided directly to locking pin 18 from oil supply groove 13. Reference is made to FIG. 4 in this connection.

Figure 3:
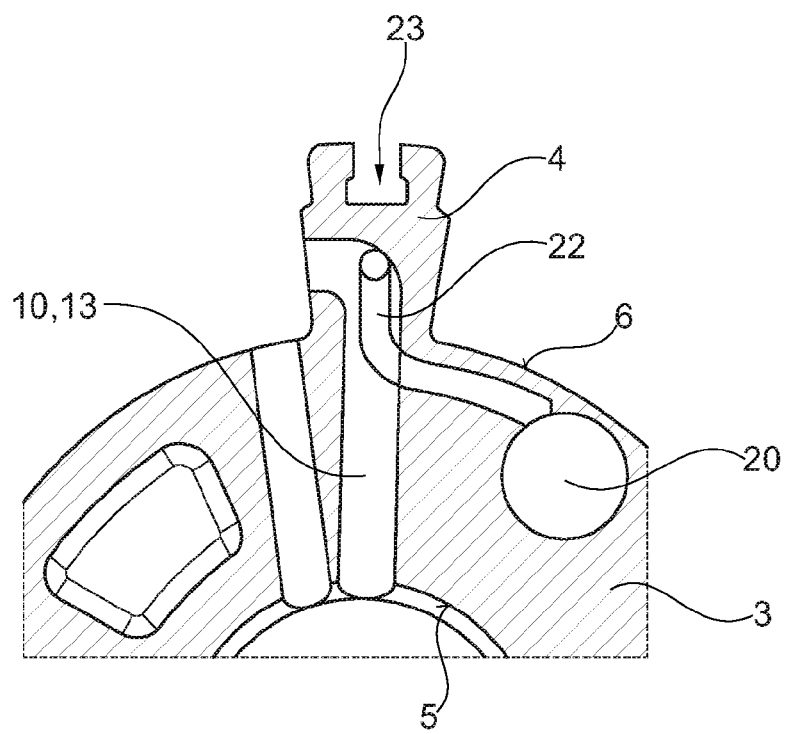
FIG. 3 shows a top view of a modified design of a rotor half.

Fluid supply line 21/worm groove 22 is also indicated in FIG. 3.

Figure 2:
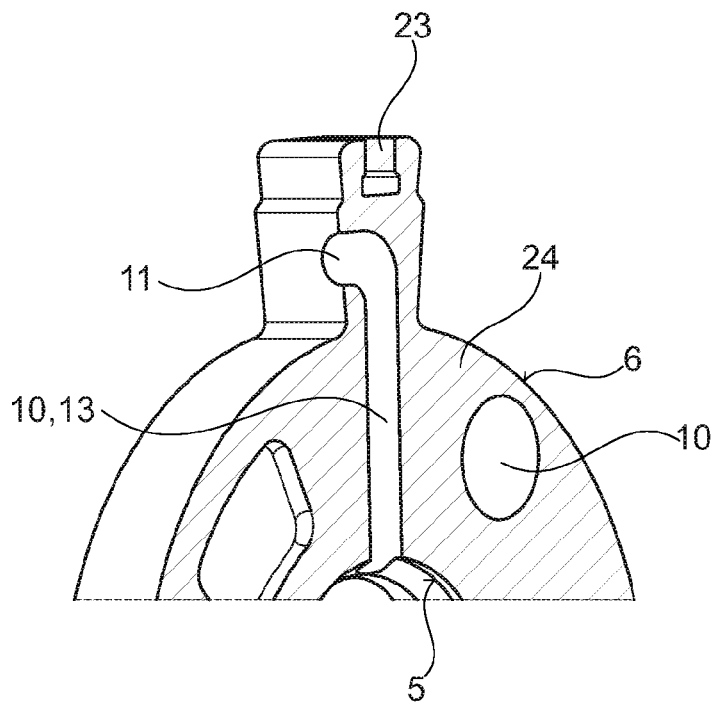
FIG. 2 shows a lower part of a two-part rotor having stamped radial bores in the parting plane and a pressure chamber supply groove exiting the rotor vane "on the front side;"

In FIGS. 2 through 4, sliding sealing insert 16 is not yet inserted in the area of a holding receptacle 23.

Only a first half 24 of rotor 3, i.e., the lower part, is illustrated in FIG. 2. Worm groove 22 also runs in vane 4, at least in sections.

The stator has a radially inwardly projecting limiting component 25 in the manner of a projection, with which contact surface 9 of vane 4 of rotor 3 may come into contact.

LIST OF REFERENCE NUMERALS 1 camshaft adjuster
2 stator
3 rotor
4 vane
5 radial inside
6 lateral surface
7 pressure chamber delimiting side
8 stop side
9 contact surface
10 pressure chamber supply groove
11 outlet
12 inlet
13 oil supply groove
14 bend/deflection
15 main section
16 sliding sealing insert
17 toothing
18 locking pin
19 recess
20 locking pin actuating pocket
21 fluid supply line
22 worm groove
23 holding receptacle
24 first half of the rotor
25 limiting component

The invention claimed is:

1. A hydraulic camshaft adjuster comprising:
a stator;
a rotor rotatably situated in the stator, a radially outwardly projecting vane being present on the rotor, the radially outwardly projecting vane being provided with a pressure chamber delimiting side,
a pressure chamber supply groove being situated in such a way that the pressure supply groove runs in a parting plane dividing the rotor into two halves for the purpose of supplying hydraulic medium to a pressure chamber formed by the rotor and the stator, the pressure chamber supply groove having an outlet in the pressure chamber delimiting side of the radially outwardly projecting vane,
wherein the pressure chamber supply groove is designed as an oil supply groove extending through one part of the radially outwardly projecting vane,
wherein the oil supply groove extends from a radially inner edge of the rotor radially outwardly into the radially outwardly projecting vane, where the oil supply groove has a bend, after which the oil supply groove runs transversely.

2. The camshaft adjuster as recited in claim 1 wherein an entirety of the oil supply groove runs in the parting plane, one half of the oil supply groove being situated in a first half of the rotor, and the other half of the oil supply groove being situated in a second half of the rotor.

3. The camshaft adjuster as recited in claim 1 wherein a contact surface is formed on the pressure chamber delimiting side of the radially outwardly projecting vane, the pressure chamber supply groove opening into the contact surface and the contact surface being provided to come into contact with a movement limiting component designed as an integral projection of the stator.

4. The camshaft adjuster as recited in claim 1 wherein a direct fluid supply line branches from the pressure chamber supply groove to a locking pin actuating pocket.

5. The camshaft adjuster as recited in claim 4 wherein the direct fluid supply line has one or multiple bends.

6. The camshaft adjuster as recited in claim 4 wherein the direct fluid supply line, which is usable for locking purposes, is completely accommodated in the rotor or divided along its length and partially accommodated in the rotor.

7. The camshaft adjuster as recited in claim 1 further comprising a sliding sealing insert in the radially outwardly projecting vane, the bend being positioned at a distance from the sliding sealing insert.

8. The camshaft adjuster as recited in claim 1 wherein the pressure chamber delimiting side is designed as a stop side, and the stop side being contactable with a movement limiting component rotatably fixedly mounted on the stator, the movement limiting component being situated on the edge of the pressure chamber formed by the stator and the rotor, the pressure chamber Tillable with the hydraulic medium.

9. A hydraulic camshaft adjuster comprising:
a stator;
a rotor rotatably situated in the stator, a radially outwardly projecting vane being present on the rotor, the radially outwardly projecting vane being provided with a pressure chamber delimiting side,
a pressure chamber supply groove being situated in such a way that the pressure supply groove runs in a parting plane dividing the rotor into two halves for the purpose of supplying hydraulic medium to a pressure chamber formed by the rotor and the stator, the pressure chamber supply groove having an outlet in the pressure chamber delimiting side of the radially outwardly projecting vane,
wherein the pressure chamber supply groove designed as an oil supply groove extending through one part of the radially outwardly projecting vane,
wherein an entirety of the oil supply groove runs in the parting plane, one half of the oil supply groove being situated in a first half of the rotor, and the other half of the oil supply groove being situated in a second half of the rotor.

10. A hydraulic camshaft adjuster comprising:
a stator;
a rotor rotatably situated in the stator, a radially outwardly projecting vane being present on the rotor, the radially outwardly projecting vane being provided with a pressure chamber delimiting side,
a pressure chamber supply groove being situated in such a way that the pressure supply groove runs in a parting plane dividing the rotor into two halves for the purpose of supplying hydraulic medium to a pressure chamber formed by the rotor and the stator, the pressure chamber supply groove having an outlet in the pressure chamber delimiting side of the radially outwardly projecting vane,
wherein a direct fluid supply line branches from the pressure chamber supply groove to a locking pin actuating pocket.

11. The camshaft adjuster as recited in claim 10 wherein the direct fluid supply line has one or multiple bends.

12. The camshaft adjuster as recited in claim 10 wherein the direct fluid supply line, which is usable for locking purposes, is completely accommodated in the rotor or divided along its length and partially accommodated in the rotor.

* * * * *